P. J. MASON.
LUBRICATING DEVICE.
APPLICATION FILED OCT. 13, 1917.
1,282,900.
Patented Oct. 29, 1918.
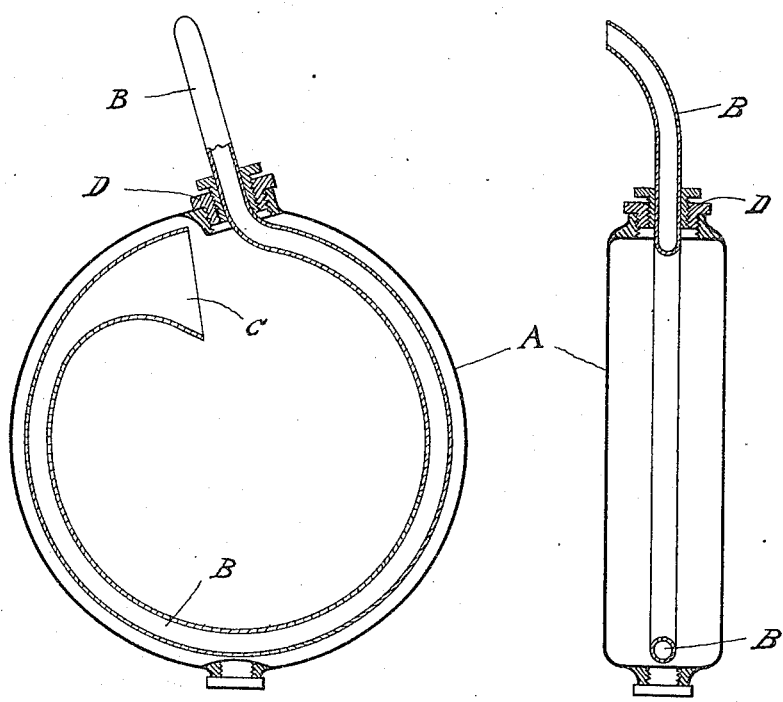
Witnesses:
E. Alder
M. Fraix
Inventor:
Percy James Mason
by C. Jewes
His Attorney.

UNITED STATES PATENT OFFICE.

PERCY JAMES MASON, OF BUNGAY, ENGLAND.

LUBRICATING DEVICE.

1,282,900.  Specification of Letters Patent.  Patented Oct. 29, 1918.

Application filed October 13, 1917. Serial No. 196,404.

*To all whom it may concern:*

Be it known that I, PERCY JAMES MASON, a subject of the King of England, residing at Bungay, Suffolk, England, but at present stationed at Darlington, England, in the British Army Service Corps, 804 MT. Company, have invented certain new and useful Improvements in Lubricating Devices, of which the following is a specification.

This invention has for its object a new or improved means and method of lubricating pinions, sprockets, chains, bearings, cams, or other similar parts of machinery by the application of centrifugal force, and in order that the invention may be clearly understood, I refer to the accompanying drawings, in which:—

Figure 1 is a sectional side elevation, and Fig. 2 an end view, also in section, of the lubricating device.

The latter consists of a circular outer casing or reservoir A inside which is fixed a tube B having a bell-shaped mouth C. This tube B passes around inside the circular casing A and is brought through said casing supported by a gland D, to the point where lubrication is required. The outer casing A is filled with oil or other lubricant and attached to the face of the pinion, sprocket, or other part of machinery to be lubricated, by any suitable means such as, for instance, a plate or clips.

Thus, on the lubricating device revolving in conformity with the pinion, sprocket, chain bearing, cam or other similar part of machinery, the lubricant is carried by the action of centrifugal force through the bell-shaped mouth C, and down the tube B, to the point where lubrication is required.

Having now fully described my said invention what I claim and desire to secure by Letters Patent is:—

In the herein described lubricating device for pinions and other rotating parts of machinery, the combination, of a circular casing in the form of a reservoir for the reception of a lubricant, a gland mounted on and secured to said casing, means to attach the casing to the face of the rotating part of machinery, and a tube arranged and passing around inside the casing, one end of said tube having a bell-shaped mouth and the other end extending through and being supported by said gland and terminating at the point where lubrication is required, all substantially as and for the purpose set forth.

In testimony whereof I have hereunto set my hand in the presence of two subscribing witnesses.

PERCY JAMES MASON.

Witnesses:
 JOHN WILLIAM WALTON,
 FREDERICK COSNER.

Copies of this patent may be obtained for five cents each, by addressing the "Commissioner of Patents, Washington, D. C."